United States Patent [19]

Hayashi et al.

[11] Patent Number: 5,307,266
[45] Date of Patent: Apr. 26, 1994

[54] INFORMATION PROCESSING SYSTEM AND METHOD FOR PROCESSING DOCUMENT BY USING STRUCTURED KEYWORDS

[75] Inventors: Takehisa Hayashi, Sagamihara; Kouki Noguchi, Kokubunji; Tsuneya Kurihara, Tokyo; Masahiro Abe, Iruma, all of Japan

[73] Assignee: Hitachi, Ltd., Tokyo, Japan

[21] Appl. No.: 741,760

[22] Filed: Aug. 7, 1991

[30] Foreign Application Priority Data

Aug. 22, 1990 [JP] Japan .................... 2-219039

[51] Int. Cl.⁵ .................................. G06F 15/40
[52] U.S. Cl. ...................... 364/419.07; 364/419.17
[58] Field of Search .................. 364/419; 395/600

[56] References Cited

U.S. PATENT DOCUMENTS

| | | | |
|---|---|---|---|
| 4,868,733 | 9/1989 | Fujisawa et al. | 364/200 |
| 4,958,284 | 9/1990 | Bishop et al. | 364/419 |
| 4,972,349 | 11/1990 | Klienberger | 364/900 |
| 4,991,087 | 2/1991 | Burkowski et al. | 364/200 |
| 4,992,972 | 2/1991 | Brooks et al. | 364/900 |
| 5,099,426 | 3/1992 | Carlgren et al. | 364/419 |
| 5,123,103 | 6/1992 | Ohtaki et al. | 395/600 |
| 5,168,565 | 12/1992 | Morita | 395/600 |

FOREIGN PATENT DOCUMENTS

| | | |
|---|---|---|
| 0032194A1 | 7/1981 | European Pat. Off. |
| 0280866A2 | 9/1988 | European Pat. Off. |
| 0361464A2 | 4/1990 | European Pat. Off. |

Primary Examiner—Roy N. Envall, Jr.
Assistant Examiner—A. Bodendorf
Attorney, Agent, or Firm—Antonelli, Terry, Stout & Kraus

[57] ABSTRACT

A document processing system for processing documents by using structured keywords comprises an output system and a receiver system. The output system includes a first storage for storing a structured keyword dictionary containing structured keywords among which relations are systematically structured, and linkage unit providing linkage information for establishing correspondences between constituent parts of an input document and corresponding ones of the keywords. The receiver system is coupled to the output system and includes a second storage for storing structured keywords among which relations are systematically structured, and retrieving unit having inputs supplied with the document and the linkage information for retrieving the document to thereby form data of a predetermined edition format by using the structured keyword read out from the second storage. Data transfer between the output system and the receiver systems can be performed either on-line or off-line.

15 Claims, 17 Drawing Sheets

STRUCTURED KEYWORD

STRUCTURED KEYWORDS

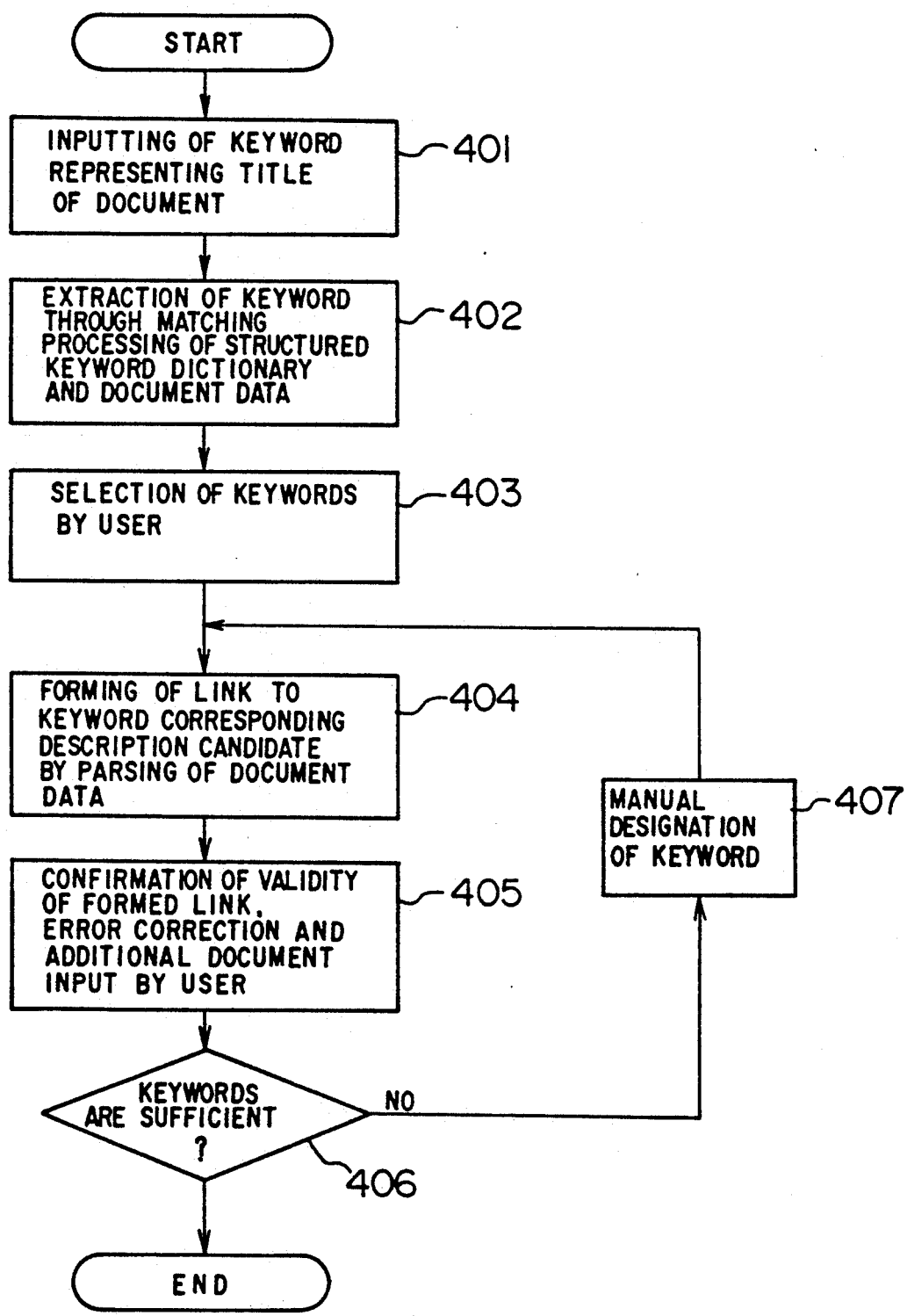

FIG. 5A

THIS TIME, COMPANY A HAS DEVELOPED A HIGH-PERFORMANCE
     *31        11             2
MICROPROCESSOR A40540 OF RISC STRUCTURE ADOPTING 1.3 μm
  1             21      14                         12
CMOS.  THE PROCESSOR HAS INTEGER OPERATION PERFORMANCE OF
 13                                                (15)
10MIPS .....
  15

*31 MAY, '87
      31        55

FIG. 5B

• MICROPROCESSOR
• DEVELOPMENT (KEYWORDS DESIGNATED
BY SENDER SYSTEM
AS SUBJECT MATTER
OF DOCUMENT)

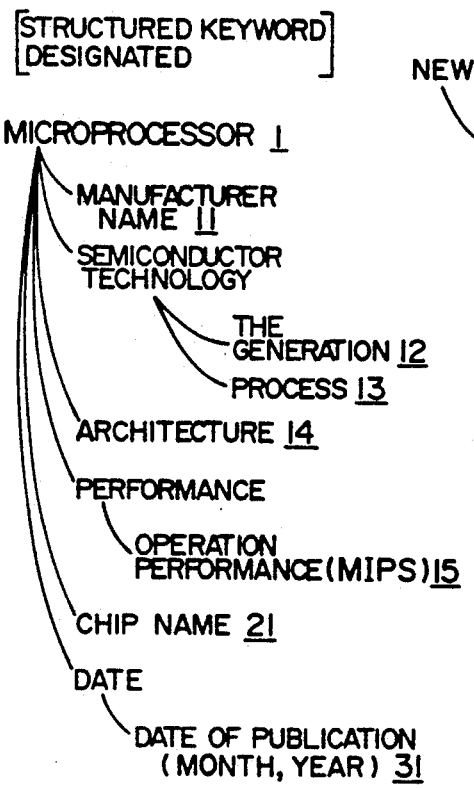

FIG. 5C

[STRUCTURED KEYWORD]
[DESIGNATED]

MICROPROCESSOR 1
   MANUFACTURER
     NAME 11
   SEMICONDUCTOR
   TECHNOLOGY
       THE
       GENERATION 12
       PROCESS 13
   ARCHITECTURE 14
   PERFORMANCE
       OPERATION
       PERFORMANCE(MIPS)15
   CHIP NAME 21
   DATE
       DATE OF PUBLICATION
       (MONTH, YEAR) 31

FIG. 5D

NEW MODEL
   DEVELOPMENT 2

FIG. 6

| [ITEMS/CONDITION FOR RETRIEVAL] | a0 | a1 | a2 | a3 | a4 |

| [EDITING FORMAT] | ITEM NO. | PUBLICATION (M,Y IN A.D) | MANUFACTURER NAME | ARCHITECTURE | PERFORMANCE (MIPS) |
|---|---|---|---|---|---|
| | 1 | | | | |
| | 2 | | | | |
| | 3 | | | | |

FIG. 8

| ITEM NO. | PUBLICATION (M,Y IN A.D) | MANUFACTURER NAME | ARCHITECTURE | PERFORMANCE (MIPS) |
|---|---|---|---|---|
| 1 | MAY. '87 | COMPANY A | RISC | 10 |
| 2 | AUGUST. '88 | COMPANY C | CISC | 7 |
| 3 | MARCH. '89 | COMPANY B | RISC | 15 |
| | | | | |

FIG. 7

| | | |
|---|---|---|
| a0 : DESIGNATION OF CONDITION FOR RETRIEVAL | | −701 |
| (RETRIEVE : MICROPROCESSOR & PUBLICATION OF NEW MODEL ) | | −702 |
| YM = MICROPROCESSOR | | −703 |
| ? DATE | | −704 |
| ? DATE OF PUBLICATION (MONTH, YEAR) | | −705 |
| &(RETRIEVE : JANUARY.'87 < YM ) | | −706 |
| a1 : ENTRY:(YM) ; | | −707 |
| a2 : ENTRY:(MICROPROCESSOR | | −708 |
| ? MANUFACTURER NAME ) ; | | −709 |
| a3 : ENTRY:(MICROPROCESSOR | | −710 |
| ? ARCHITECTURE | | −711 |
| ?(SELECT: CISC, RISC)); | | −712 |
| a4 : ENTRY:(MICROPROCESSOR | | −713 |
| ? PERFORMANCE | | −714 |
| ? OPERATION PEFORMANCE (MIPS ) ) | | −715 |

INFORMATION PROCESSING SYSTEM AND METHOD FOR PROCESSING DOCUMENT BY USING STRUCTURED KEYWORDS

BACKGROUND OF THE INVENTION

The present invention relates to information processing method and system for automatically collecting desired information from a large amount of information.

As an information processing system for acquisition of information, there is heretofore known an information retrieval system which is so arranged as to make access to a database or a knowledge base in which information has previously been stored or accumulated, as is described in JP-A-60-140443.

Further, as the methods for retrieval of information, there are known a method in which the user designates items for retrieval in accordance with items of a table constituting a part of a database on the basis of information concerning a data storage structure adopted in the database and a method of simplifying designation of the items for retrieval by resorting to an associative retrieval and a synonym processing. Besides, there has already been proposed a method according to which documents added with keywords are stored as they are for allowing extraction of document constituent parts for which coincidence is found with the keywords and a method according to which a stored document is retrieved when the keywords available for the retrieval coincide with synonyms detected from all the texts of that document.

The first mentioned prior art method is however disadvantageous in that information other than the predetermined table items can not be processed because of the tabular structure of the database. If the number of table items is increased in an effort to cope with the above problem, then the structure of the database becomes complicated, involving difficulty in maintenance and management thereof.

In the case of the document retrieving methods in which keywords are used for retrieval, the requisite information as wanted by the user can be obtained only when the user having read the extracted document part can understand the content thereof. As a consequence, when information is to be collected for a specific item or matter from many documents, the burden to be borne by the user will increase significantly, giving rise to a problem.

SUMMARY OF THE INVENTION

It is therefore an object of the present invention to provide an information processing system which is capable of automatically collecting necessary or demanded information from a large amount of stored information.

It is another object of the present invention to provide an information processing system which is substantially immune to the shortcomings of the prior art method, such as difficulty in maintenance and management, and the serious burden imposed on the user and others upon automatic collection of information.

A further object of the invention is to provide a database retrieving method and system capable of collecting automatically those data which meet the demand of the user by allowing extraction of the content of a document having meaning implied by keywords as designated.

In view of the above and other objects which will be apparent as description proceeds, there is provided according to an aspect of the present invention an information processing system comprising a combination of a sender system and a receiver system, wherein the sender system includes a structured keyword dictionary containing keywords among which relations are systematically structured, a unit for adding linkage information to constituent parts of a document as inputted which bear respective relations to the keywords selected from the structured keyword dictionary and a unit for sending out retrieval information containing the structured keywords, the linkage information and the document data added with the linkage information, while the receiver system includes a retrieving unit responsive to reception of the retrieval information from the sender system for retrieving the document data by using the linkage information and the structured keywords.

The structured keyword mentioned above may be implemented on a knowledge domain basis so as to have at least one of the links including a link to a keyword representing a higher rank concept, a link to a keyword representing a lower rank keyword and a link to a keyword representing a synonym, as is illustrated in FIGS. 2 and 3 of the accompanying drawings.

Correspondence between the keyword selected from the structured keywords and the corresponding constituent part of the document should be established in light of the structure of the structured keywords such that a keyword of concern representing an upper rank concept of the semantic content of a constituent part of the document is linked to that document part which thus represents the lower rank concept of the keyword of concern, as will be elucidated later on by reference to FIG. 5.

Further, the retrieving unit for retrieving the document data with the aid of retrieval information and the structured keywords may be composed of a functional part for designating a keyword needed for the retrieval by consulting the structured keyword dictionary, a storage for storing the structured keywords, a retrieving unit for retrieving document data by using the structured keywords stored in the storage and the retrieval information, and a second storage for storing the result of the retrieval.

In this conjunction, the second storage for storing the result of the retrieval may preferably be imparted with a function for editing the data resulting from the retrieval in accordance with a designated or inputted format for editing and storing the result of editing so that automatic editing of the document data as retrieved can be performed.

For retrieving the document data with the aid of retrieval information and the structured keyword designated and stored for the retrieval, the constituent part of the document representing the lower rank concept of that keyword should preferably be extracted by using the linkage information.

The retrieval information (i.e. information for retrieval) may preferably include in addition to at least the structured keyword, the linkage information for indicating correspondence between the structure keyword and a corresponding constituent part of the document and document data added with the linkage information as described above, at least one of information resulting from copying or extraction of a constituent part of the document corresponding to the structured keyword, document part location designating linkage information indicating the position or location of that constituent part in the document or identification information for identifying an original document to which the document part belongs. In that case, the editing can correspondingly be simplified while facilitating confirmation and correction of the document data to another advantage.

Besides, the retrieval information supplied to the receiver system from the sender system may be transmitted through a communication network, as illustrated in FIG. 1.

Alternatively, the retrieval information to be transferred as the output/input information may include at least information capable of being written in an information carrying medium and read therefrom, as in the case of an embodiment of the invention shown in FIG. 9.

According to another aspect of the invention, there is further proposed for achieving the previously mentioned objects an information processing method, wherein a process for establishing correspondences between the structured keywords and corresponding document data includes an input procedure for allowing a user to input a keyword representing subject matter of a document, a procedure for extracting a keyword through matching processing of the keywords contained in a structured keyword dictionary with the document data, a linkage forming procedure for forming a link to a candidate for constituent parts (description) in the document which corresponds to the keyword through syntax analysis (parsing) of the document data and a procedure for allowing the user to confirm the validity of the formed link or correct the link, as will hereinafter be described in detail by reference to FIG. 4.

According to another aspect of the invention, there is provided an information processing method in which a process of collecting document data through retrieval for editing includes an editing format designating procedure, a procedure for designating items to be retrieved, conditions for the retrieval and the structured keywords and a data collecting procedure, wherein the editing format designating procedure includes a procedure for inputting an editing format and items to be retrieved and a procedure for designating fields for the conditions and the items for retrieval, the procedure for designating the items to be retrieved, the condition for retrieval and the structured keyword includes a procedure for designating the retrieval condition to be entered in the retrieval condition designating field of the editing format and a procedure for designating the retrieval items to be entered in the retrieval item designating field of the editing format, and the data collecting procedure includes a retrieval procedure for performing in response to the input of the retrieval information a matching processing between the structured keyword of the retrieval information and that of the retrieval condition, and a data editing procedure for editing the document data in accordance with the editing format, wherein the data editing procedure includes a matching processing procedure for performing a matching processing between the structured keyword of the item for retrieval and that of the retrieval information, a document part extracting procedure for extracting a constituent part of document corresponding to the keyword by using document-keyword linkage information (i.e. linkage information for interlinking a document part and a keyword) contained in the retrieval information, and a storing procedure for storing the document part corresponding to the keyword in the retrieval item designating field in accordance with the editing format.

The keywords used for the retrieval of information according to the present invention are conformed to the structured keyword dictionary in which the relations between or among the keywords are systematically structured on a knowledge-domain basis (i.e. in each domain of knowledge), wherein those keywords linked together in a standardized semantic relationships, such as the relationship among concepts of higher and lower ranks, are used in the respective relevant knowledge domain. Accordingly, there arises scarce differences of individuals in understanding the keywords because the semantic relations between the keywords are easy to understand distinctively.

In conjunction with establishment of correspondences between the the constituent parts of a document and the structured keyword, it is noted that those constituent parts of the document which should semiantically belong to a same keyword may assume various meanings. Under the circumstances, it is taught according to the invention to previously establish correspondences between the keywords selected from the structured keyword dictionary and the constituent parts of the document by using the linkage information. Consequently, according to the invention, the user can get rid of trouble of handling unnecessarily lots of data for the retrieval. Furthermore, difficulty in maintenance and management can significantly be mitigated by virtue of establishment of correspondences between the keywords and the constituent parts of the document as well as owing to utilization of the standardized structured keyword dictionary as a basis.

As will be seen from the foregoing, because the linkage information for establishing correspondences between the keywords and the constituent parts of a document which semantically correspond to the above keywords are added to the constituent parts of a document, there can easily be extracted the constituent parts of the document, such as words, phrases/clauses and sentences which semantically correspond to the keywords designated by the user for the item for which he or she wants to acquire information.

Additionally, by storing internally of the information processing system the keywords designated by the user for the item for which information is to be acquired, extracting the constituent parts of the document corresponding semantically to the designated keywords from those documents supplied by way of an information network or other various media and storing the extracted document constituent parts, there can be realized an automatic data collection.

By designating the editing format for editing the data collected, the data desired by the user can be progressively and increasingly stored and accumulated. By way of example, as the editing format, a table framework may be provided, whereon the keywords may be designated at locations corresponding to the items of the table. When fresh document data are supplied to the information processing system according to the invention, the document constituent parts corresponding semantically to the individual keywords mentioned above can be extracted by using the linkage information and then can be written in the table at corresponding columns. By repeating this procedure, the table can be autonomously and increasingly expanded.

Finally, by attaching to the extracted document constituent parts the linkage information indicating the locations in a document from which the constituent parts have been extracted or by attaching the identification number of the document to which the extracted document constituent parts have belonged, the user can straightforwardly read out the relevant parts of the document and easily confirm whether or not the correspondences between the keywords and the document parts are correct, whereon an error, if any, can be corrected.

BRIEF DESCRIPTION OF THE DRAWINGS

FIGS. 4A to 4I are flow charts for illustrating exemplary procedures involved in operation of the document processing carried out by the system shown in FIG. 1;

FIGS. 5A to 5D and FIGS. 6 to 8 are views for illustrating, by way of example, in what manner a document is processed according to an embodiment of the invention by using the system shown in FIG. 1;

DESCRIPTION OF THE PREFERRED EMBODIMENTS

Now, the present invention will be described in detail in conjunction with preferred or exemplary embodiments thereof by reference to the accompanying drawings.

Figure 1:
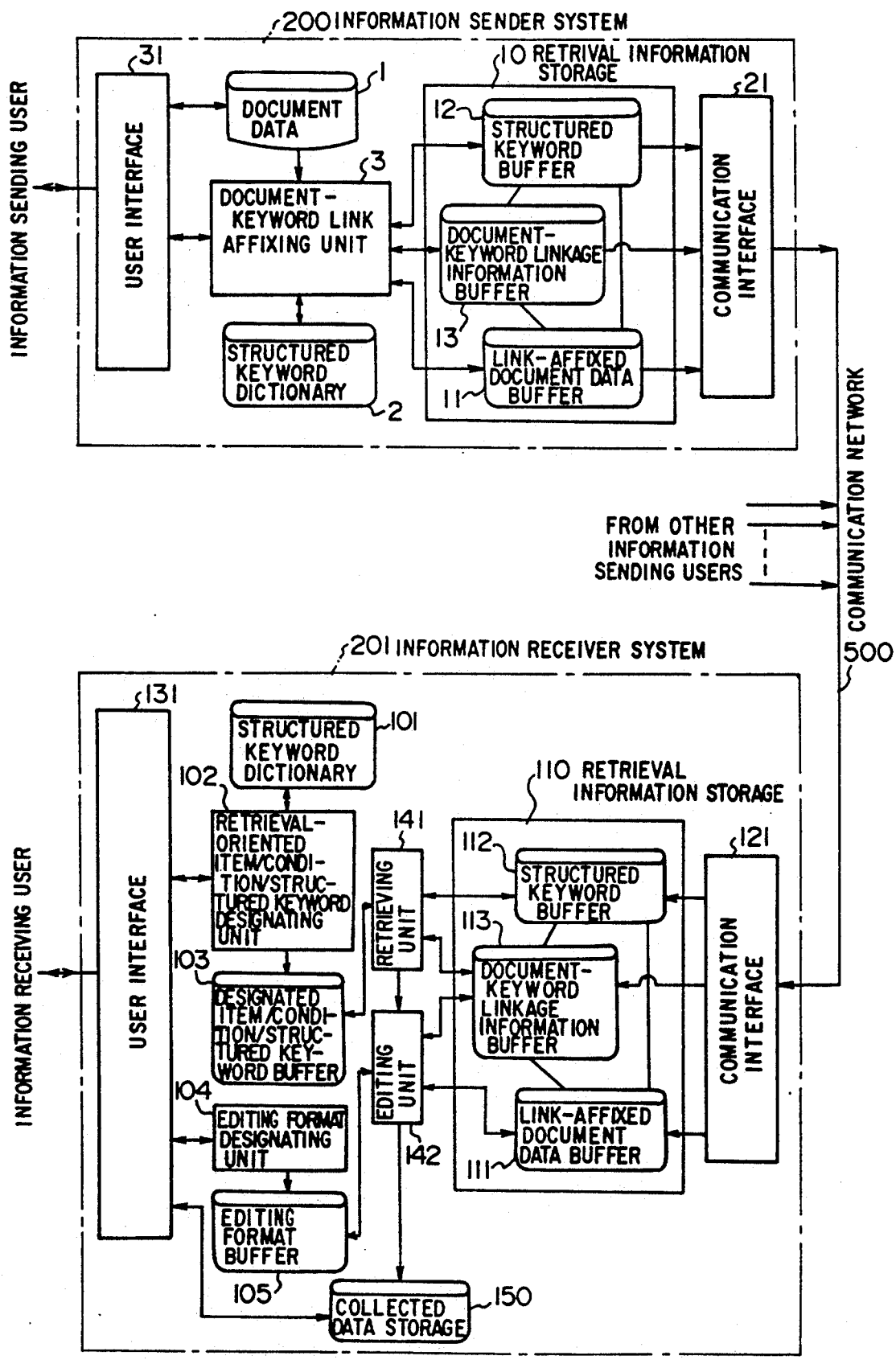
FIG. 1 is a functional block diagram showing a document processing system according to an embodiment of the invention.
Figure 2:
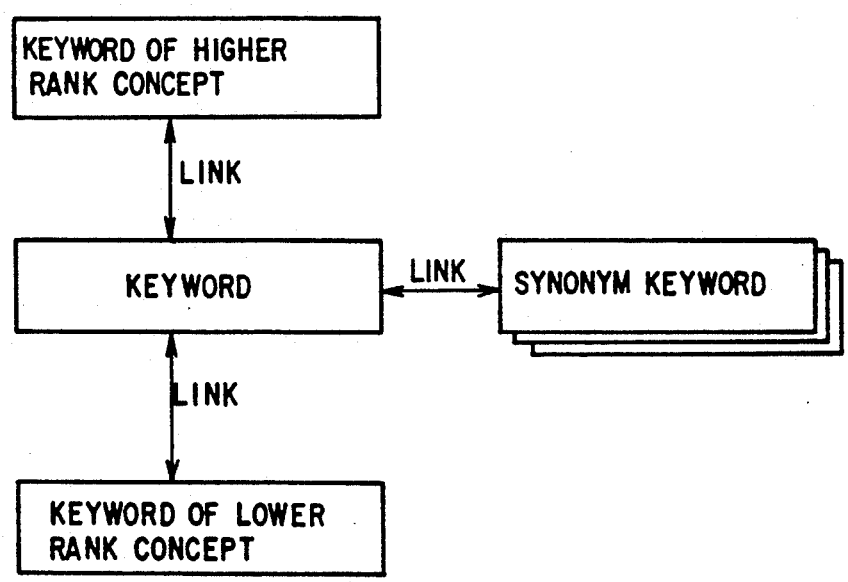
FIG. 2 is a view for illustrating an example of a structure of a structured keyword employed according to the teaching of the invention.

FIG. 1 shows in a functional block diagram a general arrangement of a document processing system according to a first embodiment of the invention. In this figure, a reference numeral 200 denotes generally an information sender system adapted to generate retrieval information (i.e. information for retrieval) to be transmitted through a communication network 500 to an information receiver system which is generally denoted by a numeral 201 and arranged to perform processing for retrieval and editing by utilizing the retrieval information as supplied. Thus, it can be said that the document processing system illustrated in FIG. 1 is implemented in the form of a retrieval information transmission/reception system, so to say. In the information sender system 200, a reference numeral 1 designates a document data storage, and a numeral 2 denotes a keyword dictionary storage. Any given one of the keywords contained in the keyword dictionary 2 is so structured as to have at least one link, including a link leading to a keyword representing an upper rank concept of the given keyword, a link to a keyword representing a lower rank concept and a link to a keyword having semantically same meaning (i.e. synonym) as the given keyword on the basis of the field or domain of the knowledge to which the given keyword belongs (i.e. on a knowledge-domain basis), as is illustrated in FIG. 2. Thus, the keyword dictionary 2 may be termed as a structured keyword dictionary containing keywords which are systematically structured by means of inter-keyword linkages or relations established as mentioned above. This dictionary 2 will hereinafter be termed the structured keyword dictionary, while the keywords related to one another by the links will be referred to as the structured keywords. Turning back to FIG. 1, a reference numeral 3 denotes a unit for selecting from the structured keyword dictionary 2 the structured keywords in the domain to which the subject matter of a given document contained in the document data storage 1 relates, for the purpose of adding to the selected document the structured keywords and linkage information which is required for establishing correspondence between the structured keywords and relevant constituent parts of the selected document. A numeral 31 denotes a user interface for actually establishing the correspondences between the structured keywords and the constituent parts of the document in accordance with the output information of the unit 3. Further, a retrieval information storage unit generally denoted by 10 serves for storing the retrieval information and includes a buffer storage 12 for storing the structured keywords (also designated by 12) as selected, a buffer 11 for storing the link-affixed document data (11) added with the information of the linkages between the constituent parts of the document and the structured keywords (hereinafter simply referred to as the document-keyword linkage information), and a buffer 13 for storing the document-keyword linkage information (13) itself. A reference numeral 21 denotes an interface through which the retrieval information 10 is sent out onto the communication network 500.

In the information receiver system 201 which can be connected to the information sender system 200, a reference numeral 121 denotes a communication interface through which the retrieval information described above is received, and a numeral 110 denotes a storage unit for storing the retrieval information as received. This storage unit 110 also includes a buffer 112 for storing the structured keywords (also designated by 112), a buffer 111 for storing the link-affixed document data (111) and a buffer 113 for storing the document-keyword linkage information, as in the case of the storage unit 10 incorporated in the information sender system 200. At least one receiver system connected to the sender systems can receive the retrieval information 10 sent out onto the communication network 500 through the communication interface 121, whereon the retrieval information 10 received is stored in the storage unit 110 correspondingly.

The user who wants to receive some information can designate with the aid of a retrieval item/condition/structured keyword designating unit 102 the items for the information to be acquired, the condition for retrieval, such as a scope or coverage of the retrieval, and relevant structured keywords, whereon these designated data are stored in a buffer storage 103. In the information receiver system 201 a reference numeral 101 designates a structured keyword dictionary which has same contents as those of the structured keyword dictionary 2 incorporated in the information sender system 200. Further, the user demanding information can designate through the user interface 131 a format for editing of information or data (hereinafter also referred to as the editing format) with the aid of an editing format designating unit 104, the designated editing format being then stored in an editing format buffer 105. A reference numeral 141 denotes a retrieving unit for searching coincidences between the structured keywords 112 of the received retrieval information stored in the buffer 112 and the data for retrieval designated by the user and stored in the item/condition/structured keyword storage 103 to thereby extract, upon detection of the coincidence, those constituent parts of the document having the meanings or contents semantically corresponding to the structured keywords for which the abovementioned coincidence has been detected, by making use of the aforementioned document-keyword linkage information 113. Further, a reference numeral 142 denotes an editing unit for editing the constituent parts of the document in conformance with the editing format 105. The collected data resulting from the editing are then stored in a collected data storage 150. The user can utilize the data stored in the storage 150 through the medium of the user interface 131.

In the description which follows, it is assumed, by way of example only, that a user of the receiver system 1 creates a comparison or collation table in connection with publication of a new model (product) of a microprocessor.

Figure 3:
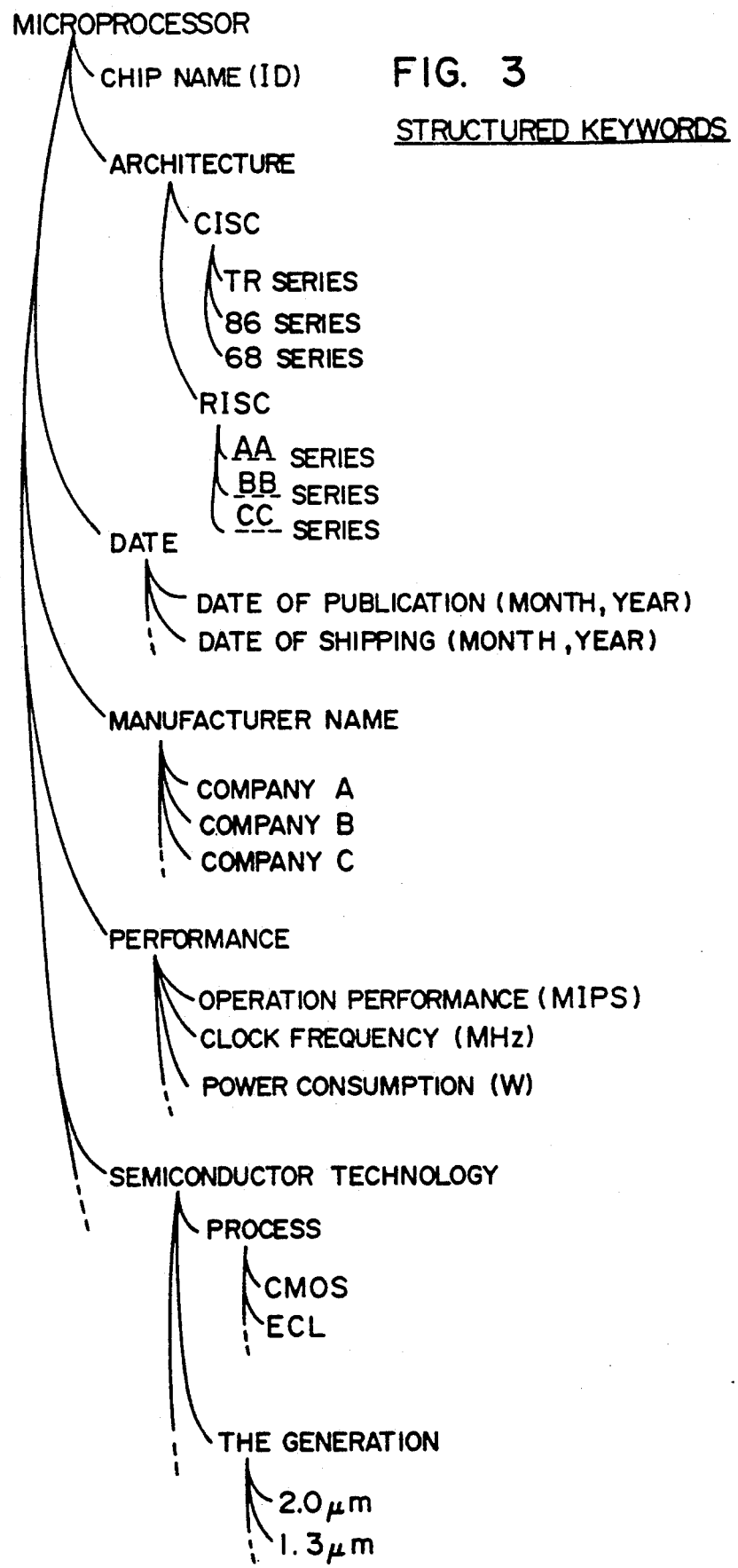
FIG. 3 is a view for illustrating, by way of example only, linkages among structured keywords.

FIG. 3 shows, by way of example, a series of systematically structured keywords. Since the knowledge domain of concern is definitly limited to the field of the microprocessor engineering, there can be created such a systematic keyword structure as illustrated in this figure. Referring to the figure, a keyword "performance" is associated with a keyword "microprocessor" of a higher rank concept and keywords "operation performance (in MIPS)", "clock frequency (in MHz)" and "power consumption (W)" of lower rank concepts relative to the keyword "performance". In another exemplary case where the higher rank keyword of "performance" is "internal combustion engine", corresponding lower rank keywords will have to be "horsepower", "fuel cost", etc. By using the keyword structure such as illustrated in FIG. 3, the meanings of the keywords can be much clarified.

Next, description will be directed to operation of the document-keyword linkage affixing unit 3 (FIG. 1) for attaching or affixing the linkage information to the constituent parts of a document which have the meanings or contents semantically corresponding to the structured keywords. FIG. 4A is a flow chart for illustrating a procedure involved in the operation of the unit 3, i.e. a method of adding the linkage information for retrieval to the document data, and FIGS. 5A to 5D are views showing a concrete example which will aid in understanding the procedure or method shown in FIG. 4A.

More specifically, FIG. 5A shows a concrete example of a document concerning the publication of a new model of microprocessor. By reference to this figure, description will be made of how the linkage information indicated by underlined numerals are added to the constituent parts of the illustrated document by using the structured keywords through the procedure shown in FIG. 4A. At the beginning, it is assumed that at a step 401 shown in FIG. 4A, the user of the information sender system 200 inputs through the user interface 31 the keywords "microprocessor" and "development" which are related to the subject matter of the document.

Figure 4B:
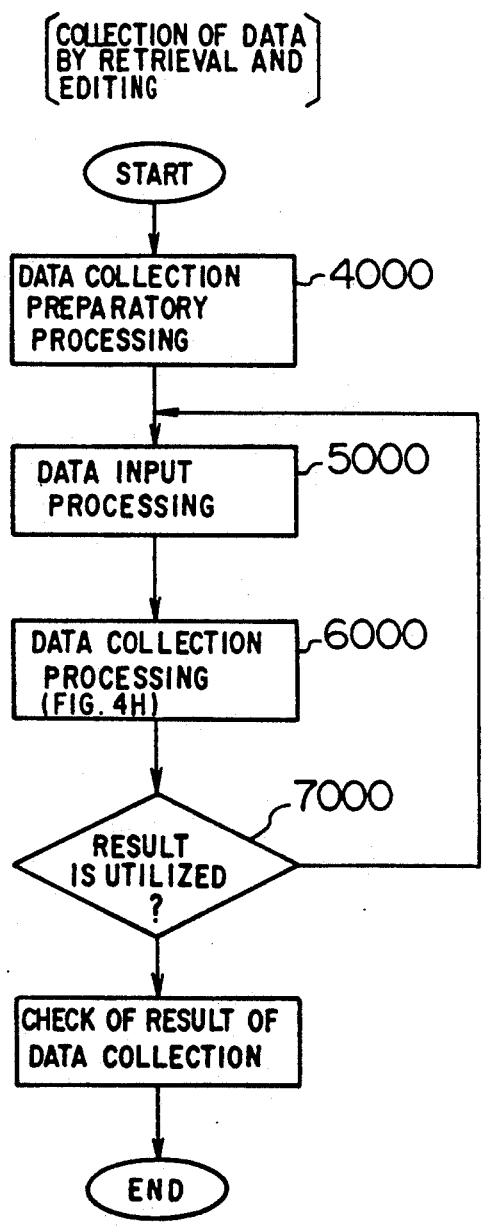

In response to this input, the document-keyword linkage affixing unit 3 shown in FIG. 1 operates to extract appropriate or relevant keywords from those contained in the structured keyword dictionary 2 through a matching processing at a step 402 shown in FIG. 4A by consulting a keyword structure for "microprocessor" such as illustrated in FIG. 3. Referring to FIG. 5A along with FIG. 3, it will readily be seen that a keyword "company A", for example, has "manufacturer name" as the keyword of higher rank concept. Similarly, a keyword "1.3 µm" will have "semiconductor technology" and "the generation" as the keywords of higher rank concepts, while "CMOS" has "semiconductor technology" and "process" as keywords of higher rank concepts. In the case of the example illustrated in FIG. 3, such keywords as "operation performance (MIPS)" and "clock frequency (MHz)" are so defined that they can be associated with corresponding numerical quantities given in "MIPS" and "MHz", respectively. This can be realized by regarding the parenthesized expressions as parameters. Accordingly, when these keywords are extracted as a result of the matching processing at the step 402 shown in FIG. 4A, the document-keyword linkage affixing unit 3 shown in FIG. 1 operates to form a linkage to a corresponding numerical quantity through a syntax analysis processing step 404 shown in FIG. 4A, as is exemplified by linkage information 15 added to "10MIPS". Incidentally, in FIG. 4A, parenthesized labels "(user)" attached to the processing steps indicate that the associated procedures or processings are to be performed by the user, while labels "(system)" indicate that the corresponding processings are executed by the system and a label "(cooperation of user and system)" indicates that the corresponding procedure is to be carried out through cooperation or interaction of the user and the system. (Same holds true in FIGS. 4B et seq..) In the case of the document exemplified in FIG. 5A, it is assumed that the keyword extracted through the matching processing 402 is "operation performance". In this case, it will be noted from the above that a constituent part of the document for which correspondence is to be established by affixing linkage information by using the keyword "operation performance (MIPS)" is "10MIPS", as indicated by the linkage information "15" in FIG. 5A. Subsequently, the user may make a decision at a step 405 by visually observing a display screen (not shown) incorporated in the user interface 31 as to whether or not the link formed as a result of the syntax analysis or parsing is correct, whereon the linkage information can be corrected, if it is found incorrect. In case too many keywords are extracted through the matching processing, selection of the keywords may be performed by the user through the user interface 31, as shown at a step 403 in FIG. 4A.

Now, at a step 406 in FIG. 4A, the user of the sender system decides whether the number of the keywords extracted at the step 402 is sufficient. When it is suspected that the keywords necessary for the retrieval of information as demanded by the user of the receiver system is insufficient, then additional appropriate keywords may manually be designated by the user at a step 407. To this end, a back-up mechanism for presenting to the user the keywords to be desirably added may be incorporated in the system. Parenthetically, it goes without saying that the keywords designated manually have to conform to the structured keyword dictionary. A user supporting system for this purpose may be incorporated in the user interface 31 in a manner known per se. Through the procedure described above, the user can also establish a link between a keyword "chip name" and a constituent part of the document "A4054" with the aid of linkage information "21", as shown in FIG. 5C.

In the above description made by reference to FIG. 3, the matching processing related to the synonym has been omitted for simplification and clarification of description. It should however be understood that through the synonym-based matching, correspondence may be established between, for example, "this time" shown in FIG. 5A and "date" shown in FIG. 3. In that case, however, difficulty will be encountered in forming a link between "this time" and "date", because the former is an indefinite expression and indicates no specific date. Such difficulty can be overcome by additionally inputting to the document shown in FIG. 5A a document constituent part 55 such as "May, '87" indicating semantically the keyword "this time" by consulting other information while the keyword "date of publication (month, year)" which is a lower rank concept of "date" may be selected as the counterpart keyword, as indicated at the step 405 in FIG. 4A. Subsequently, a link can be formed by affixing the linkage information "31". At this juncture, it should further be mentioned that this link may be so formed that the document constituent part "55" added to the document represents explicitly an annotation of "this time" by affixing "*31".

Although the linkage information for establishing correspondence between the constituent parts of a document and the structured keywords are given in terms of corresponding underlined figures or numerals in the case of the example illustrated in FIG. 5, it should be understood that pointers or other interrelating indexes may rationally be utilized in place of the underlined numerals.

Now, turning back to FIG. 1, the user of the receiver system 201 can designate the format for editing by using the editing format designating function or unit 104 and then designate the items and conditions for retrieval as well as the structured keywords by utilizing the retrieval-oriented item/condition/structured keyword designating unit 102 shown in FIG. 1, which will be described below in detail.

Figure 4C:
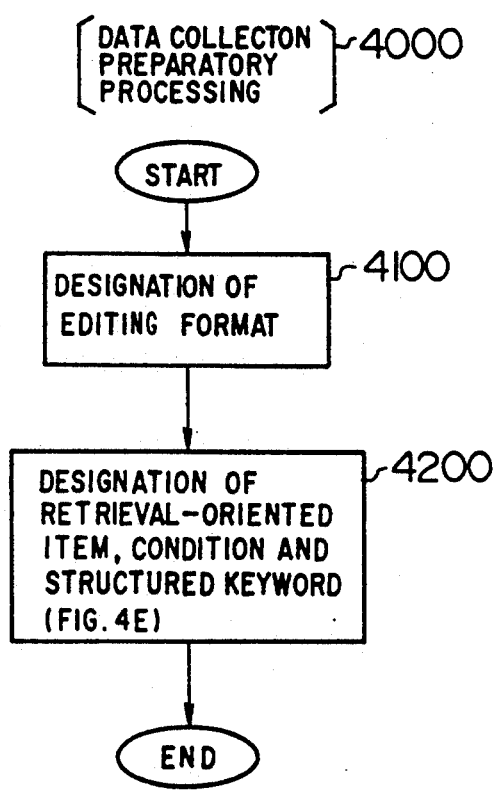
Figure 4D:
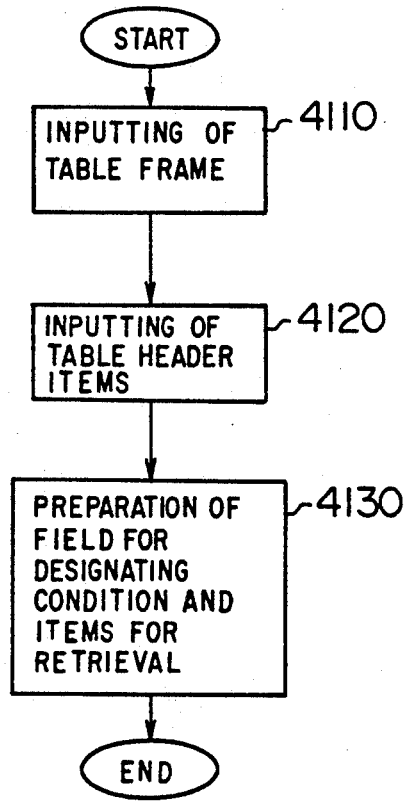
Figure 4E:
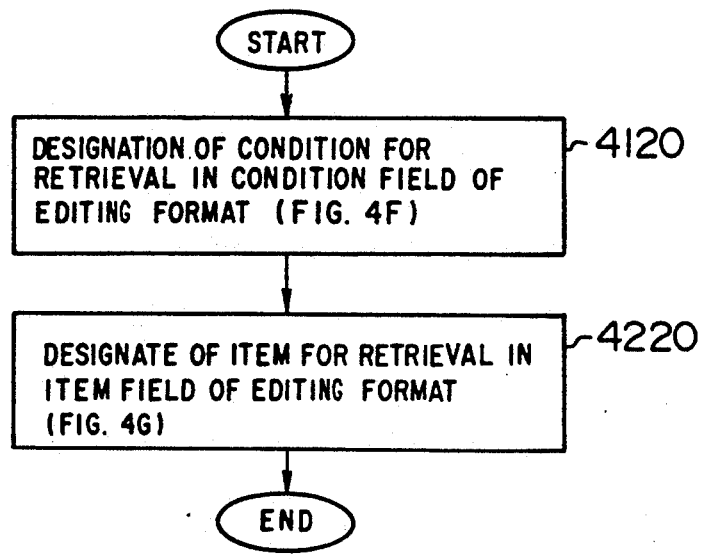

FIGS. 4B to 4I are views for illustrating procedures for collecting data through retrieval and editing in which FIG. 4B is a flow chart showing generally the data collecting procedures (including procedures 4000 to 8000) as involved, FIG. 4C is a flow chart showing in detail the procedure 4000 including processings 4100, 4200 and so forth, FIGS. 4D and 4E are flow charts showing in further detail the processings 4100 and 4200, respectively. Further, FIGS. 4F to 4I are views for illustrating in further detail the individual processings similarly to FIGS. 4D and 4E.

FIG. 6 shows, by way of example only, a format for editing together with the corresponding items and condition for retrieval.

Figure 4F:
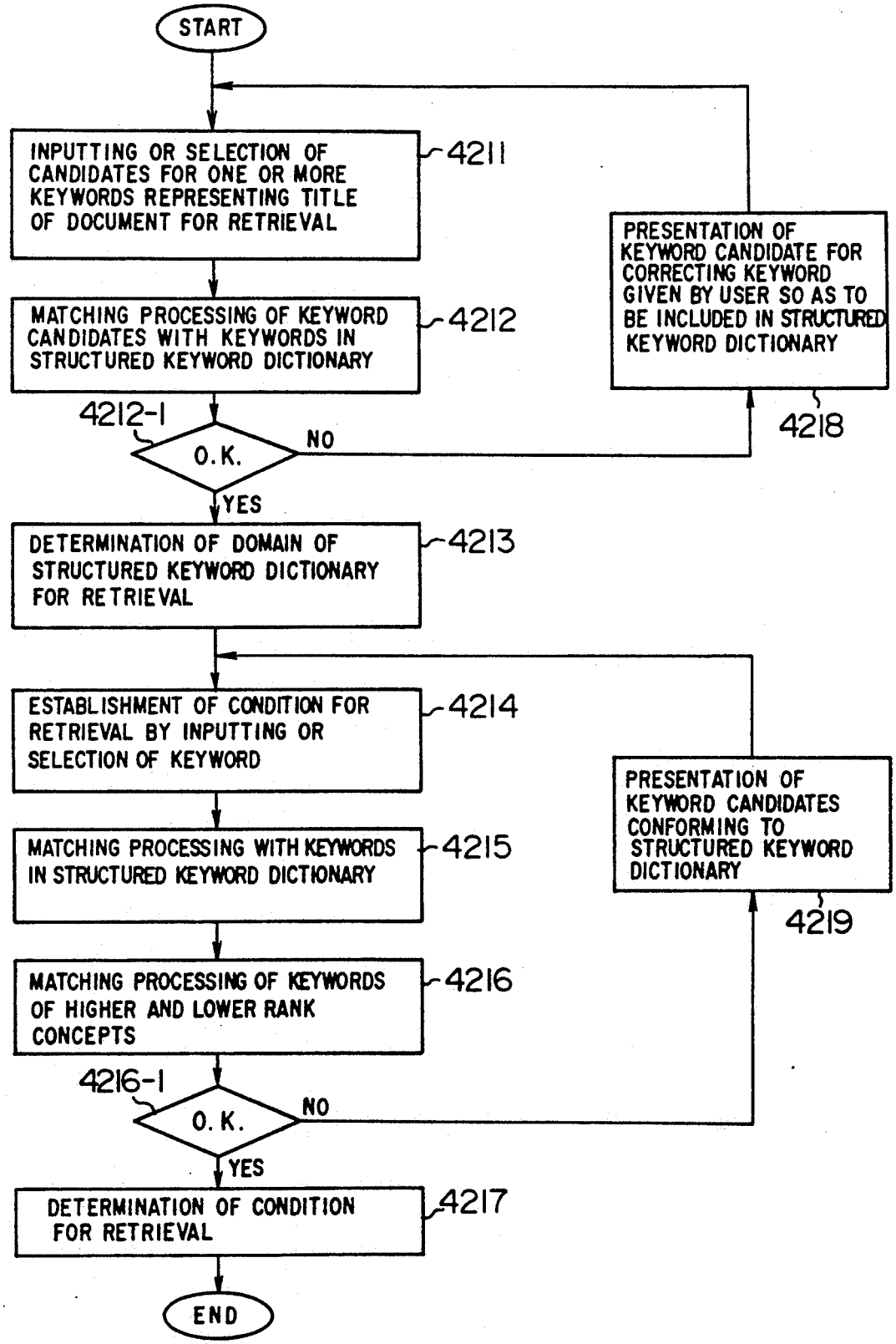
Figure 4G:
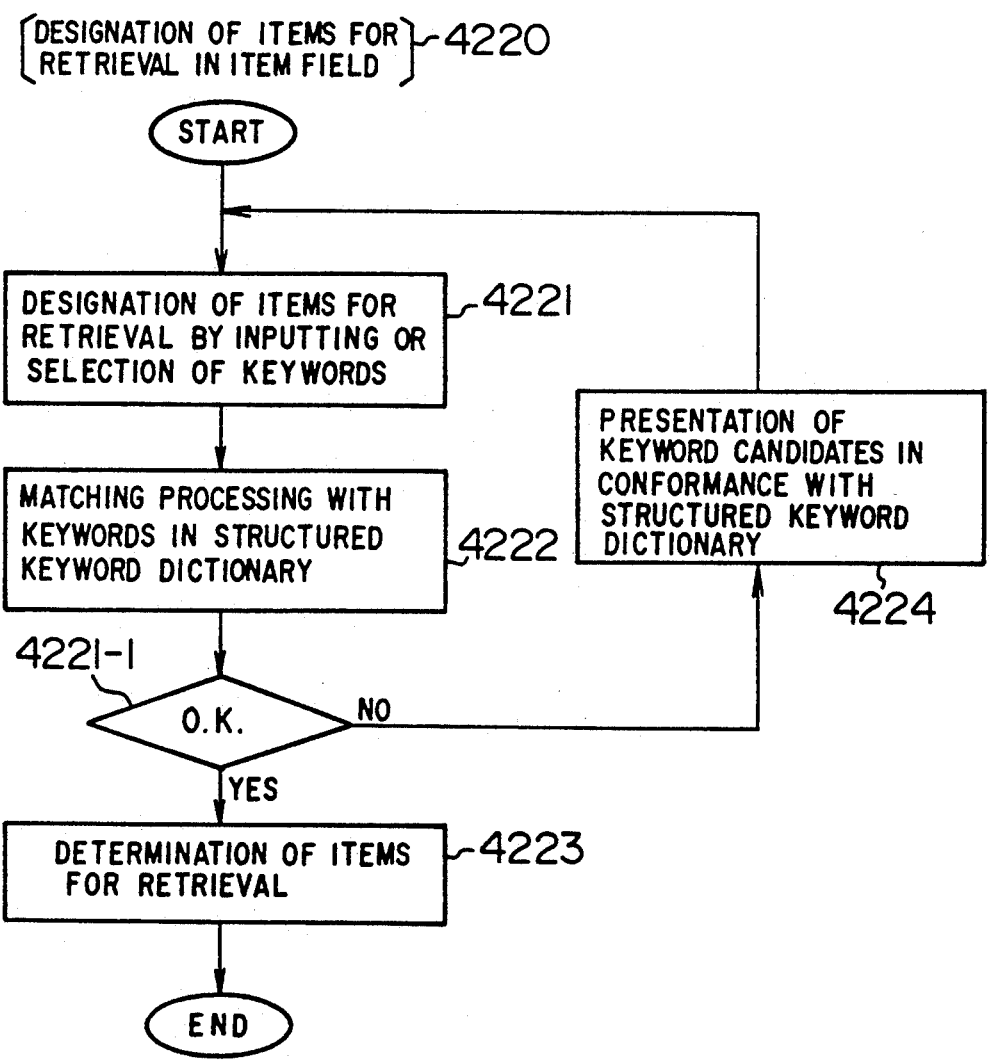

At first, the user of the receiver system designates through the user interface 131 the format for editing as well as the items and condition for retrieval and the structured keywords at steps 4100 and 4200, respectively, in a data collection preparatory procedure 4000, as shown in detail in FIGS. 4B and 4C. The editing format in the case of the illustrated embodiment is in the form of a table of such a configuration as shown in FIG. 6. Next, referring to FIG. 4D, the user inputs data for designating a frame structure of the table at a step 4110 and subsequently inputs header items of the table at a step 4120. In response thereto, the system sets up the fields for allowing designation of the items and the condition for retrieval in correspondence with the individual columns of the table at a step 4130 (FIG. 4D). Incidentally, the table preparation mentioned above can easily be realized as in the case of a table calculation system by using a spread sheet or the like means known heretofore. In FIG. 6, a reference symbol a0 denotes a field for allowing designation of the condition for retrieval, while symbols a1 to a4 denote the fields for designation of the items for retrieval which correspond to the header items, respectively. FIG. 7 shows examples of descriptions to be entered in the fields a1 to a4. In this conjunction, referring to FIG. 4E at a step 4220, the user can designate the correct keywords under interactive aid of the user interface 131 while consulting the structured keyboard dictionary 101 (FIG. 1). In that case, the condition 701 for retrieval (FIG. 7) is first designated through a procedure shown at a step 4210 in FIG. 4E. In this procedure 4210, the condition for retrieval is established through interaction between the user and the system, as shown in FIG. 4F at steps 4211 to 4219. In the case of the illustrated example, the condition for ANDing "microprocessor" and "publication of new model" shown in FIG. 7 at 702 is designated or inputted. In response to this input, a structure of the keywords related to the microprocessor and contained in the structured keyword dictionary 101 (FIG. 1) is presented to the user through the user interface (131), whereon designations of the keywords are interactively performed in conformance with the keyword structure as presented (step 4221 to 4223). In FIG. 7, a symbol "?" represents the inter-keyword link.

Through the procedures based on the presented keyword structure, the date (month, year) of the publication is determined by retrieving the interlinked keywords 703 to 705 in response to an input command "retrieve", whereon a numerical value representing the date as determined is placed in a variable "YM". At 706, another condition for retrieval that the date placed in the variable "YM" must not precede "January, '87" is designated as a logical product condition, as indicated at 706 in FIG. 7. It is designated at 707 to enter the variable "YM" in the field a1 in response to an input command "enter". Subsequently, entry of the manufacturer name in the field a2 is designated at 708 and 709. These retrieval/entry commands can arbitrarily be defined internally of the system. Next, designation is made to select either one of "CISC (Complex Instruction Set Computer)" or "RISC (Reduced Instruction Set Computer)" as the architecture of the microprocessor of concern and the selected architecture is entered in the field a3 (710 to 712 in FIG. 7). Finally, it is designated to retrieve "operation performance (MIPS)" to be entered in the field a4 at 713 to 715. At this juncture, it will be noted that the keywords "date of publication (year, month)" and "operation performance (MIPS)" are affixed with respective parameters, which designate extraction of the corresponding data of numerical quantities from the document with the aid of the linkage information.

Figure 4H:
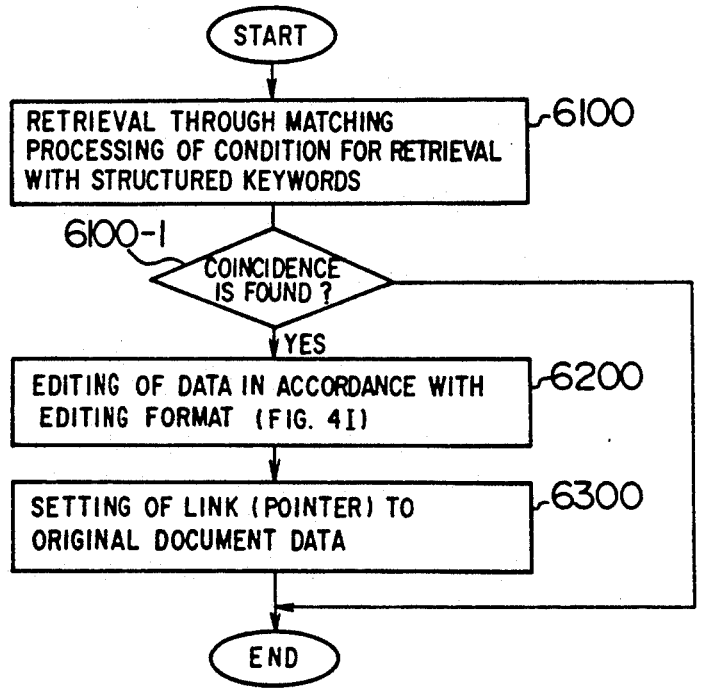
Figure 4I:
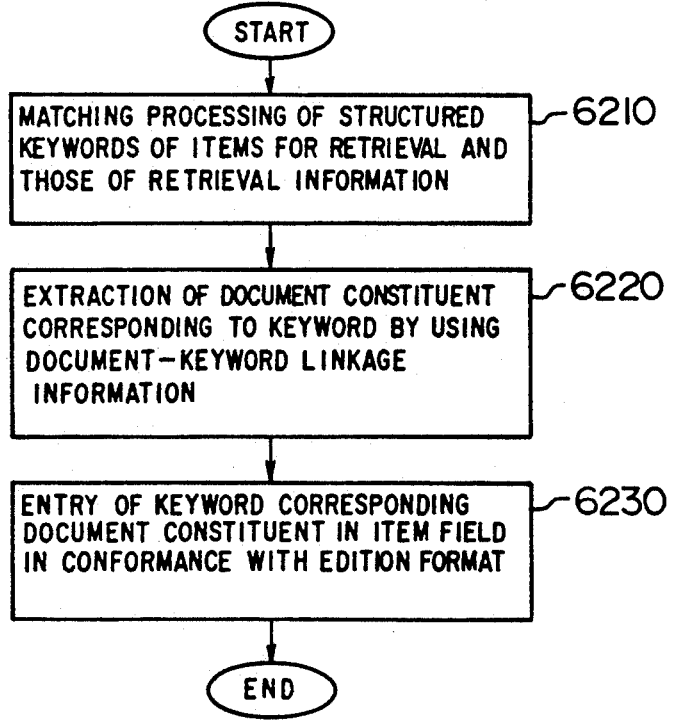

Automatic data collection is realized in the system according to the procedure (5000 to 7000) shown in FIG. 4B and, inter alia, through the processings shown in detail in FIGS. 4H and 4I. More specifically, when the information for retrieval, such as the structured keywords, the document-keyword linkage information and the link-affixed document data are loaded as input data (5000), retrieval is performed through the matching processing with the structured keywords for the retrieval condition (6100), whereby data satisfying the retrieval condition are extracted, which is then followed by editing of the data selected from those extracted in accordance with the editing format (6200). The data editing further proceeds through a procedure for matching of the structured keywords of the items for retrieval with those of the retrieval information (6210), a procedure for extracting constituent parts of a document semantically corresponding to the keywords by using the document-keyword linkage information and the link-affixed document data (Q220), and a procedure for storing the constituent parts of the document corresponding to the keywords in the field for designating the items for retrieval in accordance with the editing format (6230). Further, the document resulting from the editing is added with the linkage information existing in the original document (6300) to be utilized for correction or rearrangement.

FIG. 8 shows, by way of example, the data collected automatically in the receiver system 201 through the procedures described above. As will now be appreciated, the collation table such as shown in FIG. 8 can automatically be created by utilizing the information incoming via the communication network. By virtue of the system arrangement according to the invention, the amount of data collected in a desired format autonomously increases as a function of time lapse to an advantage.

In conjunction with the embodiment shown in FIG. 1 in which the sender system 200 and the receiver system 201 are interconnected through the communication network 500, it should be mentioned that the communication network may be implemented in the form of either a broadcasting channel or communication circuit as well. Further, in the system arrangement shown in FIG. 1, it goes without saying that the information for retrieval can be transferred between the system for generating the retrieval information and the system for performing the editing though appropriate wired connection without resorting to utilization of the communication interfaces 21 and 121 and the communication network 500. The same applies not only to the embodiment shown in FIG. 1 but also to other embodiments described below.

Figure 9A:
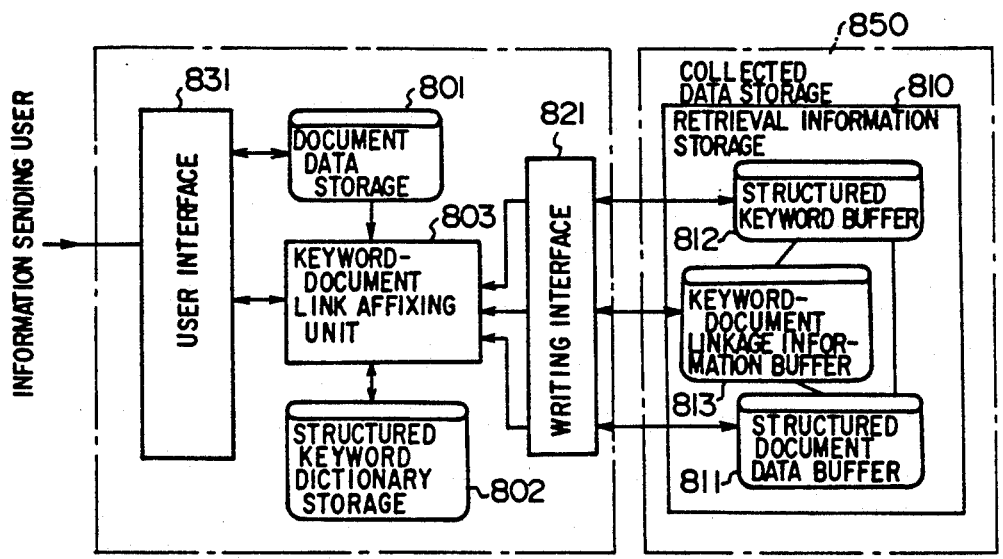
FIGS. 9A and 9B and FIG. 10 are functional block diagrams showing document processing systems according to further embodiments of the invention, respectively.
Figure 9B:
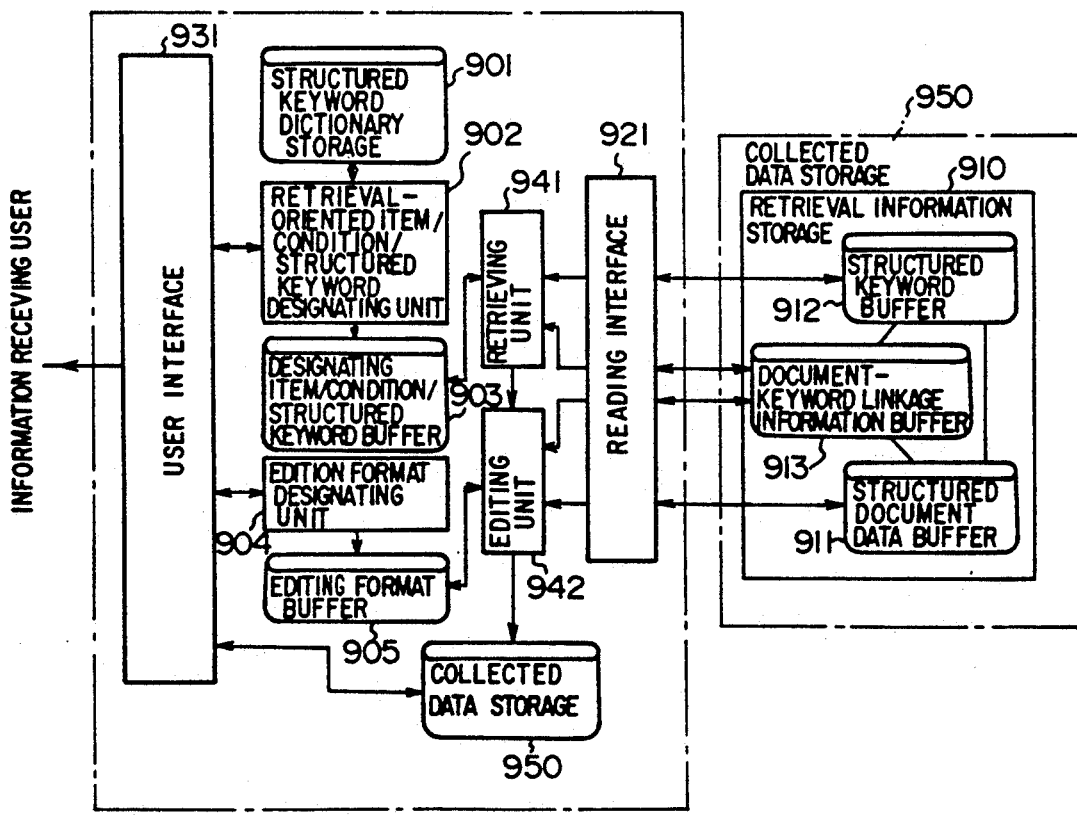

FIGS. 9A and 9B are block diagrams showing another embodiment of the invention which differs from that shown in FIG. 1, where the retrieval information 10 are sent via the communication network 500, in the fact that the retrieval information denoted here by a numeral 810 is stored in a medium and then sent as it is together with the medium itself or after having been copied to another medium dedicated for the sending. As the information storage medium or carrier mentioned above, there can be used a magnetic tape, a magnetic disk, an optical disk, a magnetooptic disk or the like. In FIGS. 9A and 9B, a reference numeral 821 denotes a write interface for writing the retrieval information on a medium, and a numeral 921 denotes a read interface for reading out the retrieval information. In these figures, other functional units serve for the same or similar operations as those indicated by like labels in FIG. 1. In the embodiment shown in FIGS. 9A and 9B, the transmission or transfer of the information is carried out off-line. However, the instant embodiment is advantageous over that shown in FIG. 1 in that the cost involved in the communication can significantly be reduced. Parenthetically, such a system arrangement which incorporates both features of the embodiments shown in FIG. 1 and FIGS. 9A, 9B, respectively, may effectively be adopted in dependence on applications as intended.

Figure 10:
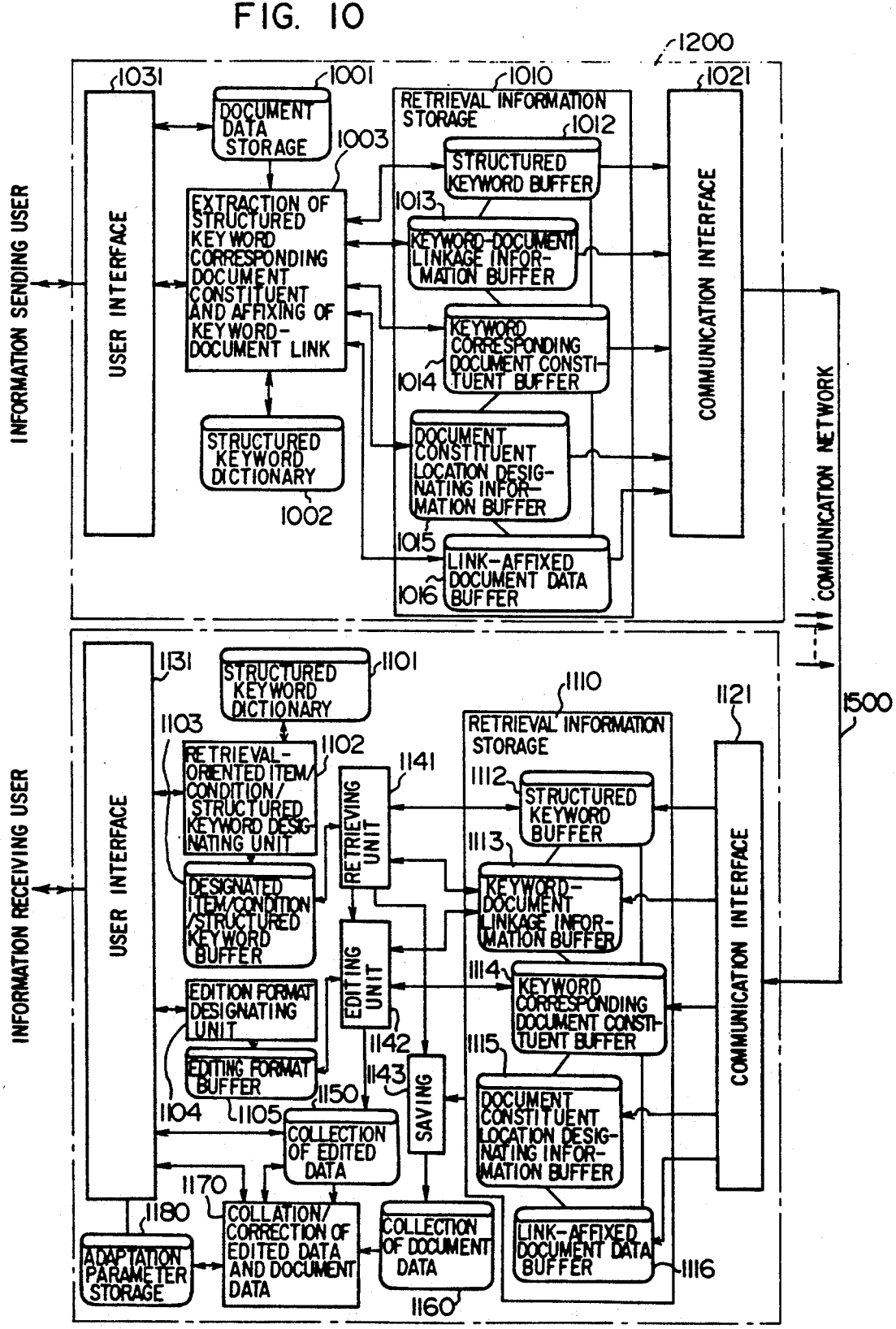

FIG. 10 is a block diagram showing still another embodiment of the invention which differs from that shown in FIG. 1 in that in the information sender system 1200, the constituent parts of a document corresponding to structured keywords (hereinafter referred to as the keyword corresponding document part) 1014 is held independently of the document data.

The instant embodiment shown in FIG. 10 is profitable when the contents of the information (document) being transmitted bears simple relations to the keywords.

The embodiment shown in FIG. 1 is suited to the case where relations between the link-affixed document data and the structured keywords are complicated, requiring a relatively great amount of linkage information and making it difficult to extract previously those constituent parts of the document which are required by the user. In contrast, in the case of the embodiment shown in FIG. 10, it is possible to previously limit the candidates for the constituent parts of document which are expected to be required by the user by virtue of the simplified correspondence relation between the keywords and the contents of the document. Thus, the burden imposed on the user upon executing the processing can be mitigated owing to the capability of dispatching the previously extracted document parts in the form of the candidates. Further, instead of sending the whole document, only the constituent parts of the document that correspond to the structured keywords may be furnished. This in turn means that the number of the document parts can be decreased, as a result of which costs involved in the communication and others can be reduced correspondingly to another advantage.

Referring to FIG. 10, the keyword-document part linkage information 1013 for establishing correspondence between the structured keywords 1012 and the keyword corresponding document parts 1014 indicates the constituent part of the document having the meaning and content corresponding to the keyword. In the case of the instant embodiment, document part location designating linkage information 1015 is also added to the link-affixed document data 1016 for indicating the location in the document from which the keyword corresponding document part is extracted (or copied). The structured keywords 1012, the keyword-document linkage information 1013, the keyword corresponding document constituent part 1014, the document part location designating linkage information 1015 and the link-affixed document data 1016 prepared in the sender system are correspondingly provided in the receiver system as well, as indicated by 1112, 1113, 1114, 1115 and 1116, respectively. Since the keyword corresponding document constituent part 1114 is extracted in a concrete form in the case of the instant embodiment, the editing 1142 can be simplified as compared with the editing in the system shown in FIG. 1. The edited data is stored in a storage 1150, while the collected document data are stored in a storage 1160.

Figure 11:
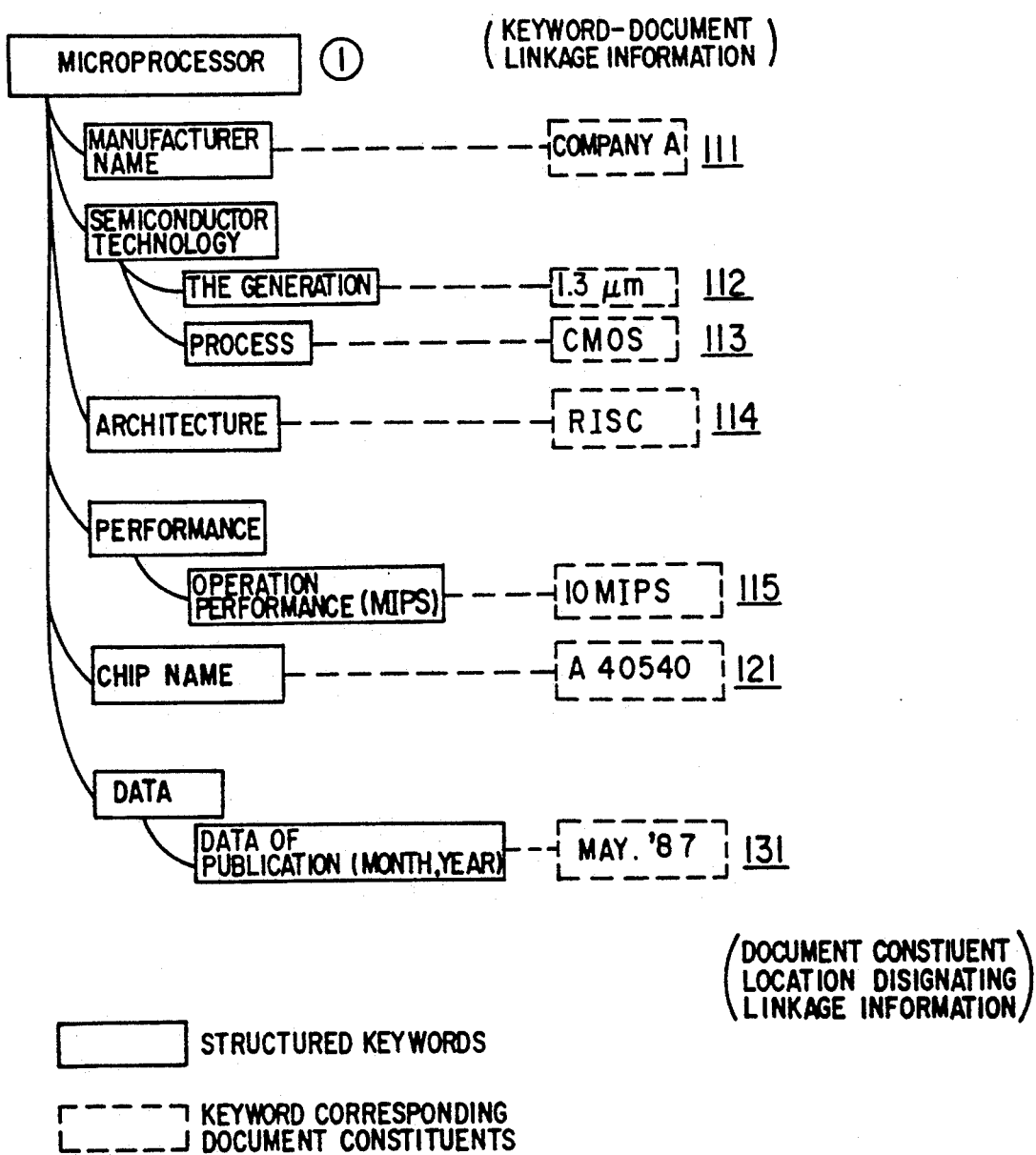
FIG. 11 and FIGS. 12A and 12B are views for illustrating, by way of example only, operations of the document processing systems according to the further embodiments of the invention.

FIG. 11 is a view showing linkage relations existing between the structured keywords and the keyword corresponding document parts in the embodiment shown in FIG. 10. As can be seen in FIG. 11, this embodiment is characterized in that the keyword, for example, "manufacturer name" is explicitly linked to the corresponding document part "company A" which is added with the document part location designating link information.

Figure 12A:
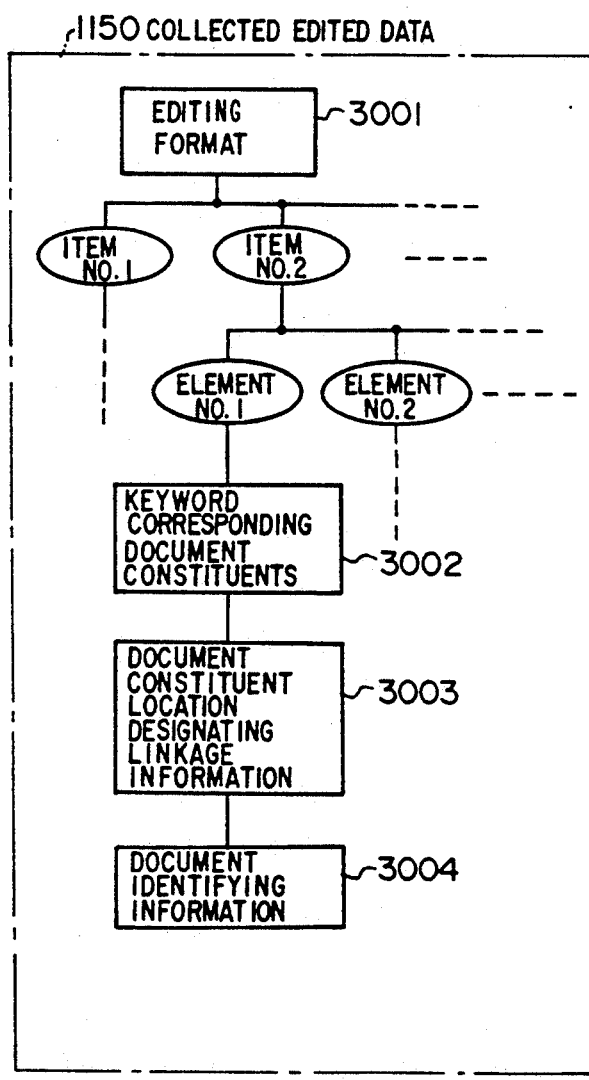
Figure 12B:
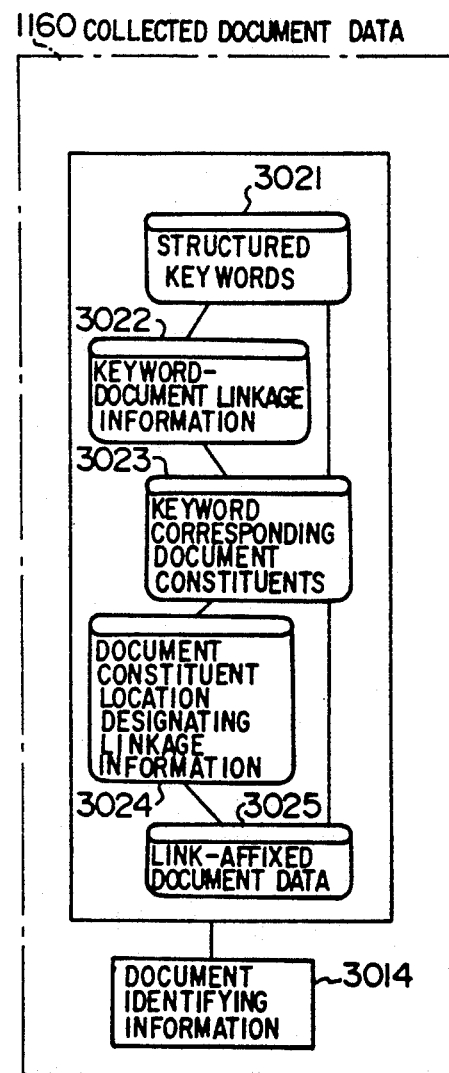

FIGS. 12A and 12B are views showing examples of the edited data 1150 and the collected document data 1160, respectively. The edited data contains the keyword corresponding document part 3002 (e.g. "company A") in accordance with the editing format 3001 such as shown in FIG. 6. This document part is added with original document identifying information 3004 and linkage information 3003 indicating the location or position in the original document where the document part 3002 exists. The collected document data shown in FIG. 12B corresponds to the retrieval information added with document identifying information 3014 corresponding to that designated by 3004 in the edited data 1150.

Referring to FIG. 10, when the user of the information receiver system observes the edited data through the medium of the user interface 131, he or she can confirm with the aid of the information 1170 the positions or locations in the document from which the items in the table are extracted, whenever it is desired. Further, when an error is found in a keyword as a result of the confirmation, the user can immediately correct the error. By storing this event in the user interface as an adaptation parameter 1180, occurrence of the same error in the succeeding retrieval can positively be prevented.

Figure 13:
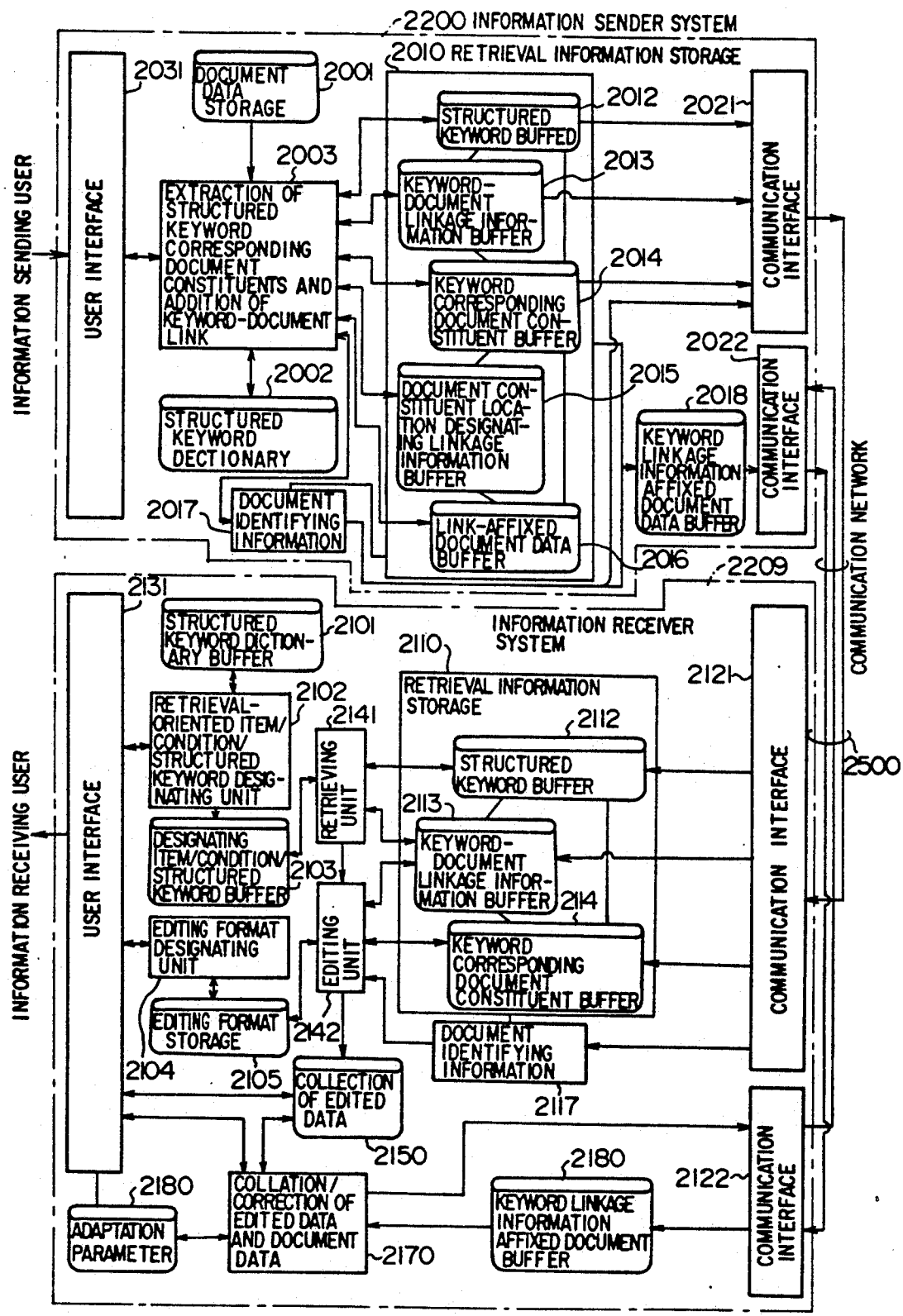
FIG. 13 is a functional block diagram showing yet another embodiment of the document processing system according to the invention.

FIG. 13 is a block diagram showing yet another embodiment of the present invention which differs from the embodiment shown in FIG. 10 in that the document data are not always sent out, but are sent only when the request for sending is issued by the user of the receiver system. In the case of the embodiment shown in FIG. 13, the information sent always to the receiver includes the structured keywords 2112, the keyword corresponding document constituent 2114 and the linkage information therefor which is added with the original document identifying information 2117. When the original document data is required by the user, the original document identifying information 2117 is sent out from the edited data/document data comparison and correction file 2170 to the sender system via the communication interface 2122, whereon the relevant retrieval information is sent back to the buffer file 2170 of the receiver system from the file 2018 of the sender station. The subsequent processing is executed in the same manner as in the case of the embodiment shown in FIG. 10.

We claim:

1. A document system for accessing desired documents by using structured keywords, comprising a plurality of output systems, a receiver system and a communication network connecting said plurality of output systems and said receiver system, wherein each of said output systems includes:

a document storage for storing therein an input document;

a first storage for storing first structured keywords among which relations are systematically structured; and linkage means providing linkage information which indicates correspondences between constituent parts of said input document and said first structured keywords;

wherein said receiver system is operatively connected via said communication network to said plurality of output systems and includes:

a second storage for storing second structured keywords among which relations are systematically structured;

retrieving means responsive to said document and said linkage information for retrieving said document to form data of a predetermined editing format by using second structured keywords read out from said second storage;

editing format storage means for storing said editing format;

editing format designating means connected to said editing format storage means for forming data having said predetermined editing format stored in said editing format storage means in accordance with retrieval data inputted to said receiver system;

said editing format storage means including means for storing data of said predetermined editing format and for supplying said stored data to said editing format designating means in response to an indication given by said retrieval means; and editing means connected to said editing format storage means and said retrieving means for editing and collecting data contained in said document which are determined by the data of said predetermined editing format.

2. A document processing system according to claim 1, wherein each output system includes first medium control means for outputting said document and said linkage information to a storage medium; and wherein said receiver system includes second medium control means for receiving from the storage medium said document and said linkage information.

3. A document processing system according to claim 1, wherein each of said structured keywords stored in said first and second storages, respectively, includes on a knowledge domain basis at least one of linkages to keywords representing a high rank concept, linkages to keywords representing a lower rank concept and linkages to keywords representing a synonym.

4. A document processing system according to claim 3, wherein said output system includes linkage means for adding, to a constituent part of said document, linkage information for establishing correspondence between said constituent part of said document and a structured keyword representing a higher rank concept of the structured keyword representing the lower rank concept of said constituent part of said document.

5. A document processing system according to claim 3, wherein said retrieving means of said receiver system includes:

structured keyword designating means for designating a keyword, for retrieving data of the document, from a structured keyword dictionary; and a storage for storing the structured keywords designated by said designating means.

6. A document processing system according to claim 1, further including a plurality of receiver systems, and communication networks connected to said plural output systems and said plural receiver systems through respective communication interfaces.

7. A document processing system according to claim 1, further comprising keyword corresponding document part extracting means connected to said retrieving means and said editing means of said receiver system for extracting data from said document which are determined by said predetermined editing format data.

8. A receiver system included in a system for processing documents by using structured keywords, said receiver system providing retrieved data for editing on the basis of a document as received and retrieval information corresponding to said received document and comprising:

a storage for storing structured keywords among which relations are systematically structured;

retrieving means responsive to said linkage information and said document for retrieving said document to form data of a predetermined editing format by using said structured keywords read out from said storage;

editing format storage means for storing said editing format;

editing format designating means connected to said editing format storage means for forming data having said predetermined editing format stored in said editing format storage means in accordance with retrieval data inputted to said receiver system;

said editing format storage means including means for storing data of said predetermined editing format and for supplying said stored data to said editing format designating means in response to an indication given by said retrieval means; and editing means connected to said editing format storage means and said retrieving means for editing and collecting data contained in said document which are determined by the data of said predetermined editing format.

9. A method of processing retrieved information in a retrieval processing system comprising an output system for adding retrieval information to a document by using structured keywords and a receiver system receiving said retrieval information and said document from said output system for providing retrieved data for editing, said method comprising:

in said output system, the steps of storing a structured keyword dictionary containing keywords among which relations are systematically structured;

providing linkage information which indicates correspondence between constituent parts of the document inputted and a structured keyword; and sending said document and said provided linkage information via a communication network to said receiver system;

while in said receiver system, the steps of storing a structured keyword dictionary containing keywords among which relations are systematically structured;

receiving said linkage information and said document and retrieving said document so as to form data of a predetermined editing format by using said structured keywords, including:

(a) forming data under a predetermined editing format in response to retrieval data inputted to said receiver system;

(b) storing data of said predetermined editing format; and (c) editing and collecting data contained in said document which are determined by the data of said predetermined editing format.

10. A retrieval information processing method according to claim 9, wherein said output system sends said document and said retrieval data to said receiver system through a communication interface.

11. A retrieval information processing method according to claim 9, wherein said output system outputs data of said document and said linkage information to a storage medium, while said receiver system receives data from said storage medium storing said document and said linkage information.

12. A retrieval information processing method according to claim 9, wherein in said output system, said structured keywords include, on a knowledge domain basis, at least one of linkages to keywords representing a higher rank concept, linkages to keywords representing a lower rank concept and linkages to keywords representing a synonym.

13. A retrieval information processing method according to claim 21, wherein, in said output system, said linkage means adds, to a constituent part of said document, linkage information for establishing correspondence between said constituent part of said document and a structured keyword representing a higher rank concept of the structured keyword, which represents the lower rank concept of said constituent part of said document.

14. A retrieval information processing method according to claim 12, wherein in said receiver system, the keyword for retrieving document data is designated on the basis of information in said structured keyword dictionary.

15. A retrieval information processing method according to claim 9, wherein in said receiver system, data determined by said predetermined editing format is extracted from said document by using said linkage information.

* * * * *